ENTERIC-COATED TABLETS OF DEXTRAN SULFATE ESTER AND METHOD OF PREPARATION THEREOF
Eiji Morii, Chigusa-ku, Nagoya, Koichi Iwata, Nishi-ku, Nagoya, and Masatsugu Shamoto, Nakagawa-ku, Nagoya, Japan, assignors to Meito Sangyo Kabushiki Kaisha, Nagoya, Japan, a corporation of Japan
No Drawing. Filed Apr. 23, 1962, Ser. No. 189,305
Claims priority, application Japan Apr. 25, 1961
9 Claims. (Cl. 167—82)

This invention relates to enteric-coated tablets of water-soluble salts of dextran sulfate ester for oral administration use, and a method of preparing the same. It particularly relates to dextran sulfate ester in tablet form, the form which is most suitable for the oral administration of this medicine which possesses excellent medicinal properties, particularly having substantially no activity as an anticoagulant but having very high lipolytic activity; and the method of preparing these tablets. Heretofore, this water-soluble salt of dextran sulfate ester has never been administered orally and moreover in tablet form, it being administered previously directly into the blood stream as an intravenous or intramusclar injection.

More particularly, the invention relates to enteric-coated tablets of dextran sulfate ester comprising a water-soluble salt of dextran sulfate ester which is coated uniformly with an enteric coating material that is insoluble in a simulated gastric fluid having a pH below 3.0 but dissolves or disintegrates in a simulated intestinal fluid having a pH 5.0–8.0; and a method of preparing these tablets.

Heretofore, it was held that a water-soluble salt of dextran sulfate ester was effective only by parenteral administration, and so was exclusively administered directly into the blood stream by intravenous or intramusclar injection. However, when a water-soluble salt of dextran sulfate ester is used for the purpose of treating hyperlipemia, even though the dose used is less than when used as an anticoagulant, since its use must continue over an extended period, the result is that this continuous administration inevitably causes an impediment to occur in the blood's coagulating ability. In consequence, the clinical application of the sulfated polysaccharides in the treatment of atherosclerosis is impeded. In this connection, we have shown previously that a water-soluble salt of dextran sulfate ester possessing together the specific conditions of an $[\eta]$ within a specified range, i.e., an $[\eta]$ of 0.020–0.050 (in a 0.7 mol saline solution at 25° C.) and a sulfur content within a specified range, i.e., S-content of 2.0–13.0% by weight, has substantially no activity as an anticoagulant but has very high lipolytic activity.

As a result of further researches in the field of water-soluble salts of dextran sulfate ester, particularly for a method of making possible the oral administration of these water-soluble salts of dextran sulfate ester which in the past could not be used clinically over an extended period of time safely for the several purposes intended while retaining their medicinal properties as an anticoagulant or lipolytic agent when administered orally, we found that the inactivation of these salts in the stomach could be prevented by making these salts into enteric-coated tablets which are coated uniformly with an enteric coating material that is insoluble in a simulated gastric fluid having a pH below 3.0 but dissolves or disintegrates in a simulated intestinal fluid having a pH 5.0–8.0.

Furthermore, surprisingly we found that in case of these enteric-coated tablets, even though a dextran sulfate ester is used whose quality is such that it was not practicable as a lipolytic agent, a high anticoagulant activity occurring naturally when used as heretofore, i.e., when directly fed into the blood stream by parenteral administration such as by means of intravenous or intramuscular injection or even though administration over an extended period, which for the same reason was not practicable, is carried out, the intended medicinal properties are effectively maintained with moreover no adverse reactions as would impede these medicinal properties, thus making it most convenient for administering these tablets orally.

Heretofore, attempts have been made for orally administering sulfated polysaccharides by using them in combination with certain salts of ethylenediamine tetra-acetic acid (EDTA), thus utilizing the $Ca^{++}$ and $Mg^{++}$ capturing activity possessed by EDTA thereby to remove from polysaccharides the metallic ions that might have an influence on the inactivation of polysaccharides. However, according to our researches, it was found that satisfactory results could not be obtained by such a method, for the sulfated polysaccharides could not be protected substantially from the action of the gastric juice, there being many factors making it difficult to conclude simply that the mechanism of inactivation was necessarily caused by the activity of $Ca^{++}$ or $Mg^{++}$ alone, and also that unless a considerable amount of EDTA is used, it was not even possible at all to prevent to a satisfactory extent the effects of such metallic ions also.

And with the biological toxicity ($LD_{50}$) obtained by the intravenous injection of mice being below 50 mg./kg., to administer such a substance in a considerable amount and moreover an extended period of time is not only undesirable but is in fact rather dangerous.

Accordingly, a primary object of the present invention is the provision of that which has not been practicable heretofore, an enteric-coated tablet which makes possible the oral administration of water-soluble salts of dextran sulfate.

Another object of the invention is to provide an enteric-coated tablet of dextran sulfate ester in which the water-soluble salt of dextran sulfate ester which was hitherto administered directly into the blood stream by means of intravenous or intramuscular injection can be taken via the digestive system and can be administered safely and over an extended period of time while manifesting its medicinal properties.

A still another object of the invention is to provide a method of preparing such an orally administrable compositions.

Other objects and advantages of the invention will become apparent from the following description.

In general, it is said that the gastric juice is strongly acidic while the intestinal fluid is alkaline. However, when closer investigation is made, the pH of gastric juice is below 3.0, and it is reported that when this acid juice moves and mixes with the alkaline digestive fluid at the duodenum, its pH becomes about 3.6–6.6, and from jejunum to ileum, about 3.6–7.9, and it is only near the colon that a pH of above 7 is shown. In any event, it is definite that the gastroenteric fluid does not change abruptly from acid to alkaline. Hence, as the material to be used as the enteric-soluble film, the requirement is that it be that which, on the one hand, is not subject to any changes at all in an acid medium of a pH below 3.0 or is not affected at least for 5–6 hours, while, on the other hand, it will dissolve or disintegrate as promptly as possible in a weak alkaline medium that is weakly acid or of pH about 7.9. Moreover, it is demanded that it be not affected by the peptic enzymes in the gastric juice and does not possess resistance to the constituents of the intestinal fluid.

While it is not quite clear by what kind of mechanism the sodium or potassium salt of dextran sulfate ester is decomposed or inactivated in the stomach, it is evident that it is not merely due to the influence of the metallic ions alone, such as Ca$^{++}$ or Mg$^{++}$ in the gastric fluid, for the actions of the various enzymes also cannot be overlooked. Therefore, satisfactory results cannot possibly be obtained by a means of adding a substance such as, for example, EDTA in the administration of the foregoing salts of dextran sulfate ester. In fact, it is rather dangerous to administer such a toxic substance in large amounts over an extended period.

According to the present invention, the water-soluble salt of dextran sulfate ester while substantially not affected in the least in the stomach is satisfactorily absorbed in the intestine, and the use of the water-soluble salt of dextran sulfate as a lipolytic agent which was not possible heretofore even if administered parenterally by means of intravenous or intramuscular injection, apart from its use as a coagulant, has not only been made possible but also the continuous administration over an extended period of a dosage which was not usable in the past can now be safely and effectively accomplished.

The enteric coating material which is to be used for such a purpose must be that which is insoluble in a simulated gastric fluid having a pH of below 3.0 but dissolves or disintegrates in a simulated intestinal fluid having a pH of 5.0–8.0.

What is referred to herein as the simulated gastric fluid has the following composition, the pH of which can be made less than 3.0 by adjusting the amount of hydrochloric acid therein:

| | |
|---|---|
| NaCl | 1.4 grams. |
| KCl | 0.5 gram. |
| CaCl$_2$ | 0.06 gram. |
| Pepsin | 3.2 grams. |
| HCl | Suitable amount. |
| Distilled water | do. |
| Total amount | 1000 ml. |

On the other hand, what is referred to as the simulated intestinal fluid has the following composition, the pH of which can be made 5.0–8.0 by adjusting the amount of sodium carbonate:

| | |
|---|---|
| NaHCO$_3$ | Suitable amount. |
| Pancreation | 2.8 grams. |
| Distilled water | Suitable amount. |
| Total amount | 1000 ml. |

According to the invention, substances that are valuable as the enteric coating material include one or more of the substances selected from the group consisting of, for example, sodium alginate, potassium alginate, ammonium alginate, cellulose acetate phthalate, sodium cellulose acetate phthalate, potassium cellulose acetate phthalate, ammonium cellulose acetate phthalate, cellulose acetate maleate, sodium cellulose acetate maleate, potassium cellulose acetate maleate, ammonium cellulose acetate maleate, polyvinyl alcohol phthalate, sodium polyvinyl alcohol phthalate, potassium polyvinyl alcohol phthalate, ammonium polyvinyl alcohol phthalate, polyvinyl alcohol maleate, sodium polyvinyl alcohol maleate, potassium polyvinyl alcohol maleate and ammonium polyvinyl alcohol maleate. However, the water-soluble salts of alginic acid such as sodium alginate, potassium alginate and ammonium alginate are particularly suitable.

And as the water-soluble salt of alginic acid, for example, the sodium salt thereof, that whose absolute viscosity in a 1% aqueous solution at 20° C. is below 500 cp. is suitable. In case rapid results in the intestine is desired, that of low viscosity is preferred. However, usually that from 60 to 100 cp. is especially suitable, the thickness of the coating having hardly any effect on its solubility in the intestines.

The water-soluble salts of alginic acid like the other enteric coating materials possess a slightly semipermeable membrane nature. Hence, when the medicine contained therein is an easily soluble substance, considerable diffusion occurs from the inside as well as the outside and there is the possibility of exudation of the medicine contained therein occurring. Now, by spraying on top of the foregoing coating a solution consisting of acetoglyceride (an acetylated product of aliphatic glyceride with the carbon atoms of the fatty acid being 12–20) and an innocuous waxy substance such as beeswax, carnauba wax, vegetable wax, Ibota wax, synthetic wax, etc. dissolved in an organic solvent, the semipermeable membrane nature of the alginates can be overcome.

The thickness of the coating layer of the enteric coating material is suitably from 0.05 to 1.0, particularly about 0.1–0.5 mm. In addition, considering that the water-soluble salts of dextran sulfate ester is highly unstable in the stomach and that their activity has a tendency of declining readily by moisture also, it is particularly desired that the coating layer be even and in effecting the coating that a powdered layer be formed by coating with powdered material. Preferably, said enteric coating material is a powder comprising one or more substances selected from the group consisting of sodium, potassium and ammonium salts of alginic acid; sodium, potassium and ammonium salts of cellulose acetate phthalate; sodium, potassium and ammonium salts of cellulose acetate maleate; sodium, potassium and ammonium salts of polyvinyl alcohol phthalate; and sodium, potassium and ammonium salts of polyvinyl alcohol maleate; it being preferred that said enteric coating material is coated as a powdered layer. In the method consisting of dissolving the coating material in an organic solvent and then applying, there occur distortions in the coating formed on the surface of the preparation due to the intense agglutinating phenomenon that is set up during the volatilization of the solvent. In consequence, the coating tends to become uneven and thus imperfect. If the coating is made thicker to prevent this, the possibility of impeding the expeditious disintegration thereof in the intestines occurs.

The dextran sulfate ester used in this invention may be that prepared by the hitherto-known processes, for example, by using chlorosulfonic acid in pyridine or in formamide in the presence of pyridine. However, for reasons such as the difficulty of controlling ($\eta$) due to the undesirable decline in the degree of polymerization, discoloration of the product, difficulty of removing the pyridine, the necessity for repeating several times the complicated purification steps, the drop in yield, etc., the sulfate used is preferably that prepared in formamide using chlorosulfonic acid in the absence of pyridine. Suitably, the sulfur content of the dextran sulfate ester is above 13.0% and more preferably above 15.0%.

When tablets containing sodium dextran sulfate (having an intrinsic viscosity of 0.02–0.05 in a 0.7 mol saline at 25° C. and a sulphur content of 13.0% by weight or more) were made into enteric-soluble preparations according to the method of the invention and tested, while the untreated product being disintegrated or inactivated by the gastric juice was not suitable for oral administration, that prepared according to the present invention manifested fully lipolytic activity and moreover in case of proper dosage did not cause a prolongation of the blood coagulating time.

Thus, for the first time it has become possible by means of this invention to use oral administration of the water-soluble salt of dextran sulfate ester safely and over extended periods in the treatment of hyperlipemia or disorders related thereto such as arteriosclerosis and the like.

In the experiment of this pharmaceutical preparation, in vitro, we observed the changes of its state in accordance with the test of enteric coated preparations, as described in the 6th ed. of the Japanese Pharmacopoeia. The results were that no abnormalities such as the excoriation, damage, etc. of the coating in a simulated gastric fluid were observed at all. On the other hand, in a simulated intestinal fluid the preparation disintegrated in 10 to 60 minutes. In the test involving the simulated gastric fluid, although a test of particularly the exudation of dextran sulfate ester, the medicine contained in the preparation, was made by means of the metachromasy reaction using Toluidine Blue, the result was negative at least for a period of 2 hours.

Next, in vivo, four normal dogs weighing from 7 to 10 kg. were used, and when in fast the present preparation was orally administered in amounts to become in terms of dextran sulfate ester per 1 kg. by body weight 10 mg., 20 mg., 30 mg. and 75 mg. respectively. Then every two hours blood was let, and by investigating the changes with the lapse of time in the blood coagulating time and lipolytic activity at the respective dosages the effectiveness of the enteric coating was judged.

From these results it was observed that while the administration in terms of dextran sulfate ester (having an intrinsic viscosity in a 0.7 mol saline at 25° C. of 0.03 and a sulphur content of 18.0%) of 10–30 mg. showed hardly any prolongation of the blood coagulating time, the administration of 75 mg. showed a definite prolongation. On the other hand, it was confirmed that the lipolytic activity was manifested clearly in all cases.

As regards the methods of measurement, the blood coagulating time was by Lee Whitis method, while the lipolytic activity was measured by the ability of the so-called active plasma containing lipoprotein-lipase which is the lipemia clearing factor, set up in the blood by orally administering the present preparation, to clear the emulsion of the below-described composition in a test tube. Namely, every 2 hours after administration blood was let by means of a syringe into which was introduced 0.2 cc. of a 10% sodium citrate solution, after which this was centrifuged for 5 minutes to separate the plasma. One cc. of this was added to 10 cc. of $\frac{1}{15}$ M phosphoric acid buffer solution (pH 7.4) together with 2 drops of a 20% sesame oil emulsion, to which was then mixed 25 cc. of human plasma (dried normal human plasma used). After mixing this with 2 cc. of an emulsion incubated for 1 hour at 37° C., the turbidity was measured at 630–650 m$\mu$ using a photoelectric colorimeter, this measuring being made A. Next, after incubating this mixture for 2 hours at 37° C., it was again measured in the same manner for its turbidity, this measurement being made B. The decrease in turbidity, i.e., A−B (represented in—long T) is made the lipolytic activity.

On the other hand when tablets of dextran sulfate ester not provided with enteric coatings were administered orally to a normal dog such that the dosage was 75 mg./kg. in terms of dextran sulfate ester and the extent of absorption was tested, neither a prolongation of the blood coagulating time nor manifestation of lipolytic activity was observed. Further, from the results of tests made by administering the dextran sulfate ester preparation of this invention to humans, an interesting fact was found that depending upon the amount administered the lipolytic activity could be caused to be manifested without prolonging the blood coagulating time.

In preparing the enteric-coated tablets of dextran sulfate ester of this invention, to the medicine containing a water-soluble salt of dextran sulfate ester are added diluent bases and lubricants such as starch, lactose, glucose, dextrin, talc, etc. and then made into tablets, as conventionally practiced, thereby forming the uncoated tablets.

Next, after applying to the tablets a sealing and subcoating as conventionally practiced, they are coated evenly with an enteric coating material that is insoluble in a simulated gastric fluid having a pH of below 3.0 but dissolves or disintegrates in a simulated intestinal fluid having a pH of 5.0–8.0. Further, the outside of the tablets is coated with acetoglyceride and a waxy substance.

According to the invention, the coating of the foregoing enteric coating material is most effectively performed in its powdery state. In forming the powdery layer, after applying a sealing and subcoating to the surface of the uncoated tablets, a conventionally used agglutinant such as gelatin, gum arabic, sugar, etc. is applied to the tablet surface. Then a powdered water-soluble salt of alginic acid is applied, and if necessary, the application of the agglutinant and foregoing powder is repeated several times whereby a coating of a powder layer of the water-soluble salt of alginic acid is formed, and thus the desired thickness of the powder layer is formed. In the past, although for this type of coating it was the customary practice to dissolve the coating material and then by either spraying, brushing or other means to form the film on the tablets, in case of the water-soluble salt of dextran sulfate ester, this type of coating is not desirable.

Sealing, subcoating, smooth coating, polishing, etc. may be performed by the conventional methods, making the necessary modification as desired.

For a clearer understanding of the present invention, the following examples are given. It is to be understood, however, that these examples are intended to be illustrative and not in limitation of the invention.

*Example 1*

To 600 grams of a powdered sodium salt of dextran sulfate ester (intrinsic viscosity 0.025, sulphur content 16.5%) were added 432 grams of starch and 120 grams of lactose and the mixture was thoroughly mixed. Then, for the purpose of expeditiously dispersing the principal medicine in the intestine and for promoting the absorption of this substance into the system from the intestine, a solution consisting of 12 grams each of a stearic acid ester of polyoxyethylene and isopropyl myristate dissolved in 100 grams of anhydrous ethyl alcohol was added and thoroughly mixed. Next, a suitable amount of hydrous ethyl alcohol was added to the above mixture, after which the mixture was granulated. After being air-dried at room temperature, 24 grams of talc was added as the lubricant, following which the mixture was made into tablets, each 300 mg. in size. 1000 grams of the so obtained uncoated tablets were placed in a coating pan, and after application of the sealing and subcoating, 15 grams of the liquid composition of Formula 1 was poured in. When the liquid had wetted the tablets evenly, and part of it started to dry and stickiness set in, 50 grams of sodium aliginate powder (120 mesh, 60 cp.) was sprinkled over the tablets, and after rotating the pan for 5 minutes, warm air from which moisture was removed was blown in and the excess powder was removed while at the same time drying was accelerated. After the first enteric coating had dried, the same liquid composition in increasing amounts of 30 grams and then 55 grams were used followed by sprinkling the sodium alginate powder and drying the coating. This was then followed by adding in several installments 45 grams of the liquid composition shown as Formula 2 and repeating the drying operations whereby the semipermeable member nature of the sodium alginate coating was overcome. Thereafter, smoothing coating and polishing operations were carried out according to known procedures, thereby obtaining the finished product.

The weight of the enteric-coated tablet prepared according to this method is 600 mg., with its sodium alginate coating weighing an average of about 30–50 mg.

These tablets showed no change in a simulated gastric fluid but disintegrated in about 10 minutes in a simulated intestinal fluid.

| Formula 1 | Grams |
|---|---|
| Gelatin | 3 |
| Gum arabic | 3 |
| Sugar | 28 |
| Water | 66 |
| Total | 100 |

Formula 2:
- Beeswax _____ 10
- Acetylmonoglyceride _____ 10
- Carbon tetrachloride _____ 80

Total _____ 100

When the enteric-coated tablets prepared according to this example was orally administered to arteriosclerosis patients continuously at the rate of 15 mg./kg. in terms of dextran sulfate ester and the total cholesterol, free cholesterol and c/p value were measured, the results in all cases showed a marked decrease. On the other hand, when the effects of this preparation on the blood coagulating time of healthy individuals were observed by orally administering these tablets continuously over a 90-day period at the rate of 50 mg./kg. per day, the results showed no prolongation whatsoever of the blood coagulating time.

*Example 2*

Except that instead of sodium alginate a total of about 80 grams of sodium cellulose acetate phthalate was used, this was carried out exactly as in Example 1.

The weight of the resultant enteric-coated tablet of dextran sulfate ester was 600 mg. and the thickness of its powder layer of sodium cellulose acetate phthalate was about 0.1 mm.

This tablet showed no change in a simulated gastric fluid but disintegrated in about 30 minutes in a simulated intestinal fluid. And when this tablet was orally administered to arteriosclerosis patients, the results were practically the same as in the case of Example 1.

*Example 3*

Except that instead of sodium alginate about 150 grams of sodium polyvinyl alcohol phthalate was used, this was carried out exactly as in Example 1.

The weight of the resultant enteric-coated tablet was 600 mg. and the thickness of its powder layer of sodium polyvinyl phthalate was about 0.2 mm.

The results of the test made of this tablet in vitro and in vivo were practically the same as in case of Example 1.

*Example 4*

To 600 grams of powdered sodium salt of dextran sulfate ester ([η] 0.048, sulphur content 19.5%) were added 432 grams of starch and 120 grams of lactose and thoroughly mixed therewith. Then for the purpose of expeditiously dispersing the principal medicine in the intestine and for promoting the absorption of this substance into the system from the intestine, a solution consisting of 12 grams each of a stearic acid ester of polyoxyethylene and isopropyl myristate dissolved in 100 grams of anhydrous ethyl alcohol was added and thoroughly mixed. Next, a suitable amount of hydrous ethyl alcohol was added to the above mixture, after which the mixture was granulated. After being air-dried at room temperature, 24 grams of talc was added as the lubricant, following which the mixture was made into tablets each 300 mg. in size. 1000 grams of the so obtained uncoated tablets were placed in a coating pan, and after accomplishing the application of the known sealing and subcoating, warm air was blown in and the tablets heated to about 30° C. Then the liquid composition of formula 3 was applied to the tablets with a sprayer, and after the tablets dried the spraying was again performed. This operation was repeated several times and thereafter application of a smoothing coat and polishing were carried out according to known methods, thus obtaining the finished product.

The weight of the enteric-coated tablet prepared by this method was 600 mg. and the polyvinyl alcohol phthalate coating had a thickness of 0.05 mm. and a weight of about 2-3 mg.

This tablet showed no change in a simulated gastric fluid but disintegrated in about 50 minutes in a simulated intestinal fluid.

Formula 3: Grams
- Polyvinyl alcohol phthalate _____ 10
- A 50/50 alcohol/acetone mixture _____ 90

Total _____ 100

In a test of the enteric-coated tablets, in vivo, prepared by this example, at a dosage in terms of dextran sulfate ester of 30 mg./kg., a significant prolongation of the blood coagulating time was observed.

Having thus described the nature of the invention, what we claim is:

1. An enteric-coated tablet of dextran sulfate ester comprising a water-soluble salt of dextran sulfate ester coated uniformly with an enteric coating material which is insoluble in a simulated gastric fluid having a pH below 3.0 but dissolves or disintegrates in a simulated intestinal fluid having a pH ranging between 5.0 and 8.0.

2. The enteric-coated tablet according to claim 1 wherein said water-soluble salt of dextran sulfate ester is characterized by an intrinsic viscosity in the range of from about 0.02 to about 0.05 in a 0.7 mol saline at 25° C. and a sulfur content of at least about 13% by weight.

3. The enteric-coated tablet according to claim 1 in which said enteric coating material comprises at least one substance selected from the group consisting of sodium alginate, potassium alginate, ammonium alginate, cellulose acetate phthalate, sodium cellulose acetate phthalate, potassium cellulose acetate phthalate, ammonium cellulose acetate phthalate, cellulose acetate maleate, sodium cellulose acetate maleate, potassium cellulose acetate maleate, ammonium cellulose acetate maleate, polyvinyl alcohol phthalate, sodium polyvinyl alcohol phthalate, potassium polyvinyl alcohol phthalate, ammonium polyvinyl alcohol phthalate, polyvinyl alcohol maleate, sodium polyvinyl alcohol maleate, potassium polyvinyl alcohol maleate and ammonium polyvinyl alcohol maleate.

4. The enteric-coated tablet according to claim 3 in which the thickness of the layer of said enteric coating material is between about 0.05 and 1.0 mm.

5. The enteric-coated tablet according to claim 4 in which said enteric coating material is a powder.

6. The enteric-coated tablet according to claim 3 in which said enteric coated material further comprises an outer sealing coating.

7. The enteric coated tablet according to claim 6, wherein said outer sealing coating includes acetoglyceride and a waxy substance.

8. A method of regulating the lipolytic activity of the liver, comprising orally administering a tablet provided with an enteric coating and containing a water-soluble salt of dextran sulfate, said coating being selected to prevent release of said water-soluble salt of dextran sulfate until said tablet is contacted by intestinal fluid.

9. A method of regulating the lipolytic activity of the liver, comprising orally administering a tablet provided with an enteric coating and containing a water soluble salt of dextran sulfate, said coating being selected to prevent release of said water-soluble salt of dextran sulfate in gastric fluid and to release said water soluble salt of dextran sulfate in intestinal fluid having a pH in the range of about 5.0 to 8.0.

References Cited in the file of this patent

UNITED STATES PATENTS

| | | |
|---|---|---|
| 2,957,804 | Shuyler | Oct. 25, 1960 |
| 3,070,595 | Petracek et al. | Dec. 25, 1962 |

(Other references on following page)

OTHER REFERENCES

Chapman et al.: "Physiological Availability of Drugs in Tablets," Canad. Med. Ass'n J., vol. 76, pp. 102–106, January 15, 1957.

Dragstedt: "Oral Medication With Preparations for Prolonged Action," J.A.M.A., vol. 168, No. 12, pp. 1652–1955, November 22, 1958.

Lazarus et al.: "Oral Prolonged Action Medicaments: Their Pharmaceutical Control and Therapeutic Aspects," J. Pharm. and Pharmacol., vol. 11, No. 5, pp. 257–290 (pp. 266–271, 277–279, and 285–288 are especially pertinent to in vivo tablet availability of drugs), May 1959.

Campbell et al.: "Oral Prolonged Action Medication," Practitioner, vol. 183, pp. 758–765, December 1959.

Yamada et al.: "Studies on Some Actions of Sulphated Polysaccharides on Arteriosclerosis. IV. Oral Administration of Dextran Sulphate," Japan Circulat. J. 25(6), pp. 579–582, June 1961 (per Index Medicus, 3(4) S–1004, April 1962, and Biological Abstracts 37(1)), #1185, January 1, 1962.

UNITED STATES PATENT OFFICE
CERTIFICATE OF CORRECTION

Patent No. 3,126,320                                                 March 24, 1964

Eiji Morii et al.

It is hereby certified that error appears in the above numbered patent requiring correction and that the said Letters Patent should read as corrected below.

Column 3, line 41, for "carbonate" read -- bicarbonate --; column 5, line 45, for "long" read -- log --.

Signed and sealed this 27th day of October 1964.

(SEAL)
Attest:

ERNEST W. SWIDER                                        EDWARD J. BRENNER
Attesting Officer                                           Commissioner of Patents